United States Patent [19]

Gurstein et al.

[11] Patent Number: 5,449,988
[45] Date of Patent: Sep. 12, 1995

[54] VACUUM MOTOR CONTROL INCLUDING FLOAT SWITCH AND IN-RUSH CURRENT RESTRAINT

[75] Inventors: Russell Gurstein, Hayden, Id.; Richard Westlake, Hillsboro, Oreg.

[73] Assignee: U.S. Products, Inc., Hayden Lake, Id.

[21] Appl. No.: 219,830

[22] Filed: Mar. 30, 1994

[51] Int. Cl.⁶ .............................................. H02P 1/16
[52] U.S. Cl. ..................... 318/430; 318/482; 15/319
[58] Field of Search ............... 318/430, 431, 434, 482; 388/804, 811, 819, 829, 831, 903, 929; 417/40; 15/319, 320, 345; 134/21; 55/215, 216

[56] References Cited

U.S. PATENT DOCUMENTS

| | | |
|---|---|---|
| 4,993,104 | 2/1991 | Kasper et al. ........................ 15/319 |
| 5,234,319 | 8/1993 | Wilder ................................... 417/40 |

*Primary Examiner*—Bentsu Ro
*Attorney, Agent, or Firm*—Browdy and Neimark

[57] ABSTRACT

A soft start power control device for a liquid vacuum motor includes a detection component for shutting off the vacuum motor when the vacuum's recovery tank reach full capacity, and in-rush current limiting component for restraining the in-rush current to the motor when the power is switched on, whereby the motor slowly ramps up to its operating speed. The motor is switch by a triac. The device includes a component for preventing the triac from inadvertently triggering at commutation frequency. A snubber circuit is also connected in parallel with the triac to limit the dv/dt characteristic. The detection component includes a float switch to monitor the level of liquid in the recovery tank. The detection component disables the motor once the water reaches a predetermined high level, which then requires the operator to empty the recovery tank before restarting the motor.

5 Claims, 4 Drawing Sheets ary also lead to a decrease in the useful life
VACUUM MOTOR CONTROL INCLUDING FLOAT SWITCH AND IN-RUSH CURRENT RESTRAINT The present invention relates to an improvement in liquid vacuum cleaners, and in particular to a protective motor control device for stopping the vacuum motor, and for limiting and restraining the in-rush current to the vacuum motors upon restart.

BACKGROUND OF THE INVENTION

There are vacuum cleaners or devices known in the art which are capable of taking up liquids. An electric motor generates a vacuum to draw in and collect liquids and solutions in a recovery tank. There are also know devices which draw in dust and other solid particles, as well as water, in the recovery tank. These devices will hereinafter be collectively referred to a liquid vacuum cleaners. A typical liquid vacuum cleaner device comprises a container for holding a cleaning liquid or water, a pump to dispense and work the liquid on the surface to be cleaned, and a powerful suction device draws in the liquid and deposits it in a recovery tank.

A problem with such liquid vacuum cleaners is that once the water level of the tank rises above a certain level, there is a risk of overflowing from the tank and interfere with the proper operation of the vacuum cleaner. Consequently, level-controlled disconnection systems have been used to switch off the motor once a predetermined water level is reached. One known system employs a water sensor arranged at a predetermined height inside the tank which may consist of two separate current-carrying wires. When liquid is drawn into the tank, the two respective wires have resistance values differing in such a manner that this changed state can be detected and evaluated for switching off the motor.

Another system employs a float within the recovery tank. This float is connected with string that is connected to a micro switch. As the tank is filled, the float will rise and block the sucking orifice of the motor at the top of the tank. In doing so, the float pulls the string, and opens the micro switch to stop the motor. In this system, incomplete blocking of the orifice may give rise to overflowing. Water may also be sucked into the motor, thereby shortening the life of the motor. Even where the blocking is complete, the motor is still rotating, which also shortens the motor's life, as well as waste energy.

Another problem with vacuum motors, especially ac motor, arises with the shut-off switching of the motor or commutation of the thyristor. Internal switching by a thyristor such as a bidirectional triods thyristor, or triac, may arise from its dv/dt characteristic. Commutation is more severe with inductive loads (e.g., motors) than with resistive loads because of the phase lag between voltage and current. Once the triac is switched, it only has a brief interval during which to recover. At this time the current of the power handling triac falls below the holding current, the triac ceases to conduct. If the voltage across the triac rises to rapidly, the triac will resume conduction and loss of control is the result.

In-rush current which occurs during the initial start up or switching on of the power supply can have a deleterious effect on electrical devices. The initial in-rush current forces the motor jump to its operating speed immediately and abruptly. This places a great deal of stress and strain on the vacuum motor, thereby shortening the useful operating life of the motor. In addition, high in-rush current during the switching on procedure may also lead to a decrease in the useful life of the brushes and power line switch.

OBJECT OF THE INVENTION

The object of this invention is to shut down the motor when the liquid in the recovery tank is at a predetermined level in order to prevent overflowing.

Another object of the invention is to prevent the further operation of the motor while at the high liquid level in order to compel the operator to empty the tank before resuming work.

Another object of the invention is to enhance the operator safety of the vacuum by requiring a leak in the float switch in addition to a failure in the isolation transformer or the optoisolator before a safety malfunction of the invention occurs.

The object of this invention is to provide for the soft start of a vacuum motor to reduce power line transient loads to within normal circuit ratings.

Another object of the invention is to prevent erratic speed operation of the motor from brush interrupting of the triac circuit.

A further object of this invention is to limit the in-rush current to the vacuum motor, which allows the motor to ramp up to its operating speed, in order to increase the operating life of the motor.

SUMMARY OF THE INVENTION

To achieve the objects of the invention and in accordance with the purpose of the invention, as embodied and broadly described herein, a preferred embodiment of the invention for a control device for a motor comprises a float switch means, a triggering circuit means, and power switching means. The triggering circuit means preferably includes a trigger pulse generator. Power switch means preferably is a triac. The float switch means actuates when the water level in the recovery tank rises to a predetermined height. An optoisolator means preferably separates the float switch means from the triggering circuit mean. A signal is sent through the optoisolator means to the triggering circuit means. The triggering circuit means then triggers the triac to switch off the motor. A restart signal is sent to the triac only after the water has been emptied from the recovery tank, and the vacuum motor switch has been toggled from on to off and back to on again. Upon restart, the triggering circuit means initiates a soft start of the motor. In addition, to further limit commutation during internal switching, a snubbing circuit may be attached parallel to the triac.

DESCRIPTION OF THE PREFERRED EMBODIMENT(S)

Figure 1:
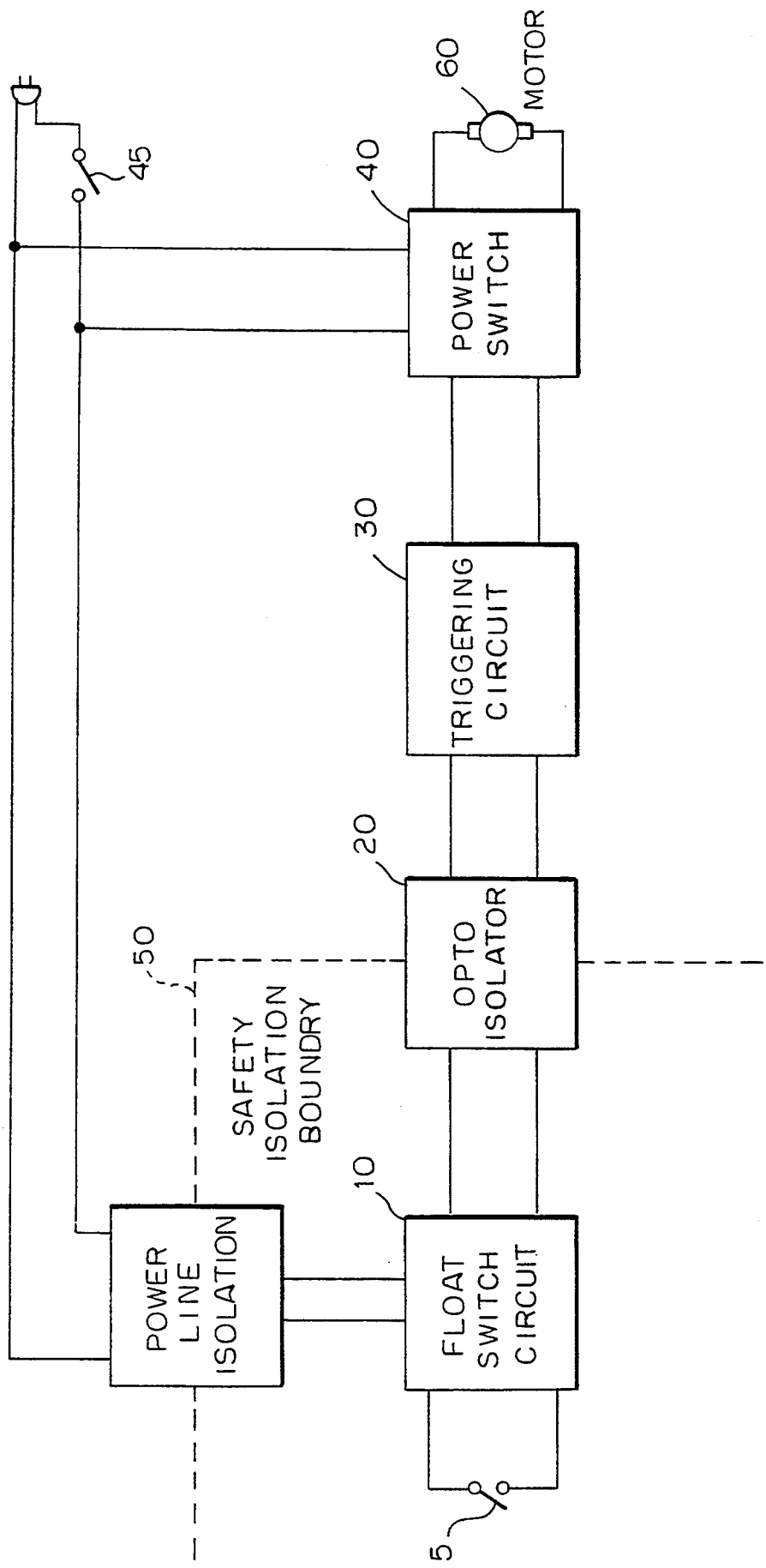
FIG. 1 is a block diagram of a preferred embodiment of the invention.

Referring now to the accompanying drawings and specifically to FIG. 1, a preferred embodiment of the present invention for a motor control device comprises circuit float switch 10, optoisolator 20, triggering circuit 30, and power switch 40. Triggering circuit 30 is preferably an IC chip with a full wave trigger pulse generator. Power switch 40 preferably is a thyristor such as triac Q1. Circuit float switch 10 and optoisolator 20 are isolated from the power line as shown by dotted line 50 on FIG. 2. Float switch 10 activates when the water level in the recovery tank rises. When the water reaches a certain level, a signal is sent through the optoisolator 20 to the triggering circuit 30.

Triggering circuit 30 triggers the power switch 40 triac Q1 to switch off the motors 60. A trigger signal maybe sent to triac Q1 only after the water has been emptied from the recovery tank, and the vacuum motor switch 45 has been cycled from on to off and back to on again. Upon restart, the triggering circuit 30 initiates a soft start of the motor. In addition, a snubbing circuit 35 may be added in parallel to power switch 40 to further limit the possibility of false retriggering of the triac during turn off commutation.

Figure 3:
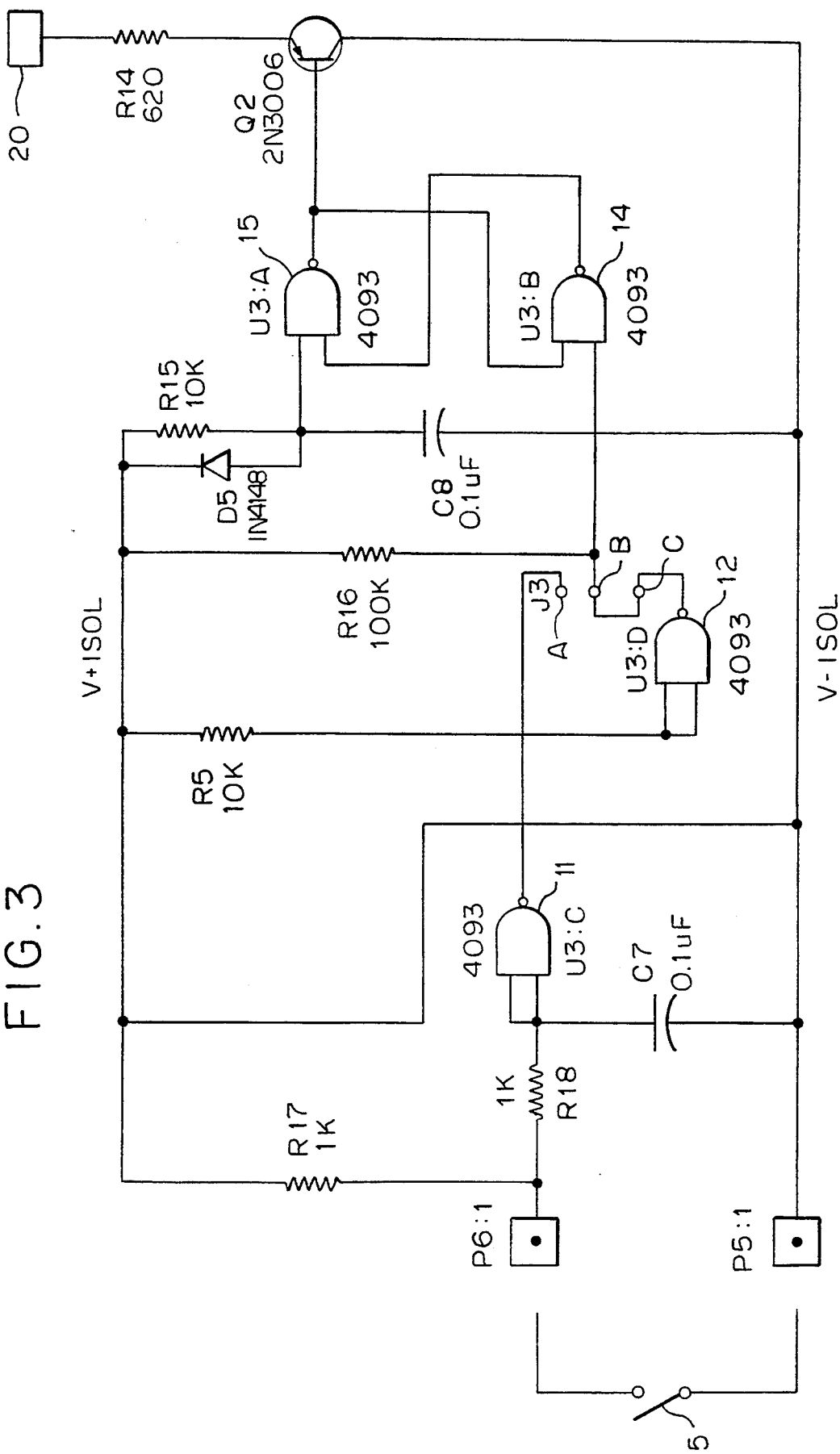
FIG. 3 is a schematic of a preferred float switch for a preferred embodiment of the invention, as indicated by reference number 2 in FIG. 2.

In accordance with FIG. 3, circuit float switch 10 may be set to trigger depending on whether its initial state is normally open or closed. Either may be selected by positioning the appropriate jumper to connect either terminals A and B for "normally closed" or B and C for "normally open." Therefore, the invention may be set for either normal condition of the float switch for monitoring the water level of the recovery tank. The circuit float switch 10 may have a reed switch 5 for monitoring the water level.

In either event, the output of either the "normally closed" or the "normally open" NAND gates 11 or 12, respectively shown on FIG. 3, is initially "0". When the water reaches a high level in the recovery tank, reed switch S is triggered. The output of either NAND gate 11 or 12 becomes "1". This then becomes the input for NAND gate 14. NAND gate 14 and NAND gate 15 are interconnected to form a flip-flop circuit for controlling transistor Q2 of float switch 10, which is connected to the light emitting diode LED of the optoisolator 20. In accordance with FIG. 2, optoisolator 20 is connected to trigger circuit 30.

The flip-flop turns on transistor Q2 of float switch 10, thereby completing the circuit for the optoisolator 20. The light from the LED triggers the photo-transistor of optoisolator 20. This in turn causes the trigger circuit 30 to remove the on trigger signal power switch 40 (triac Q1) to switch off the motor 60.

Figure 2A:
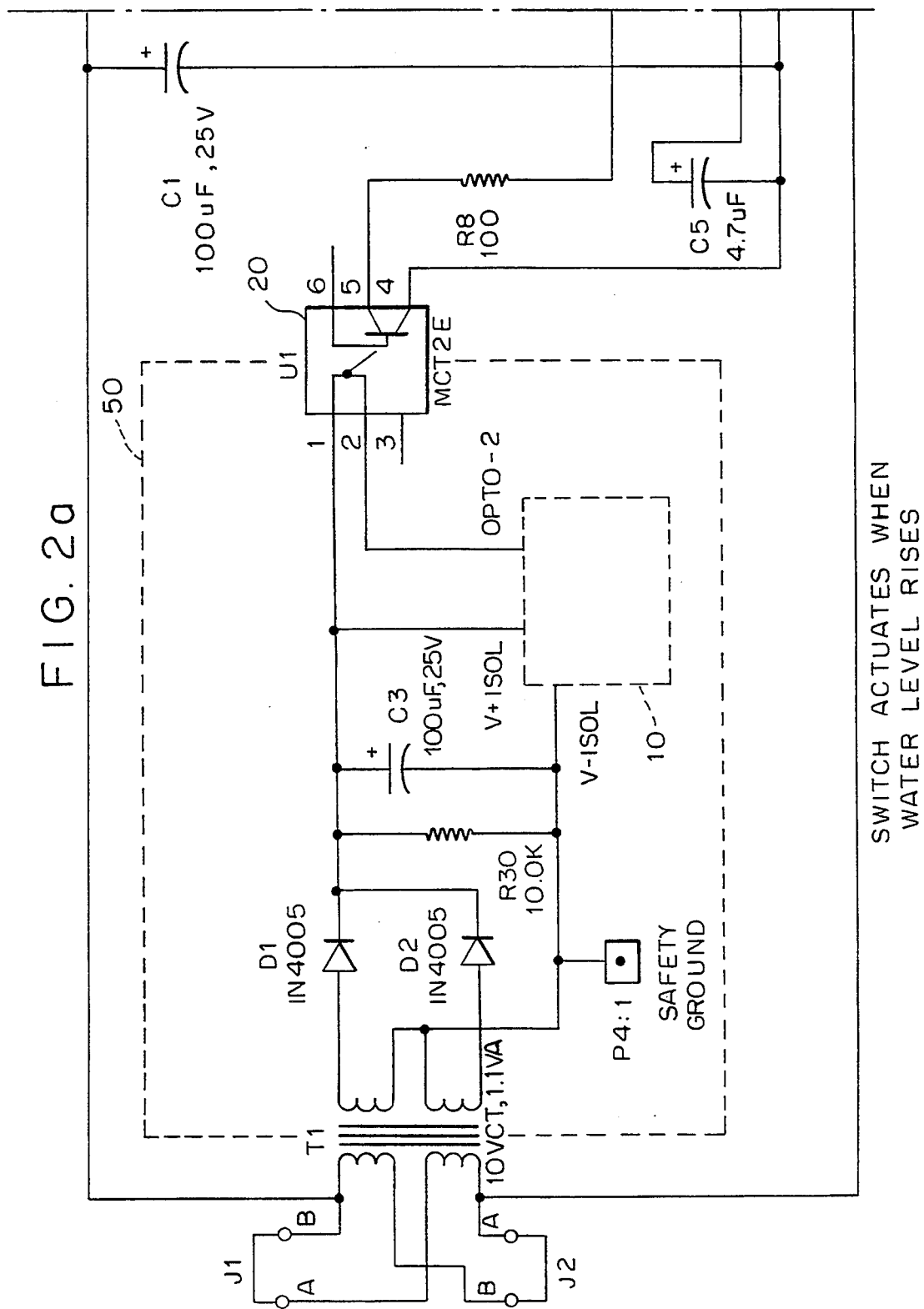
FIG. 2 is a schematic of a preferred embodiment of the invention.
Figure 2B:
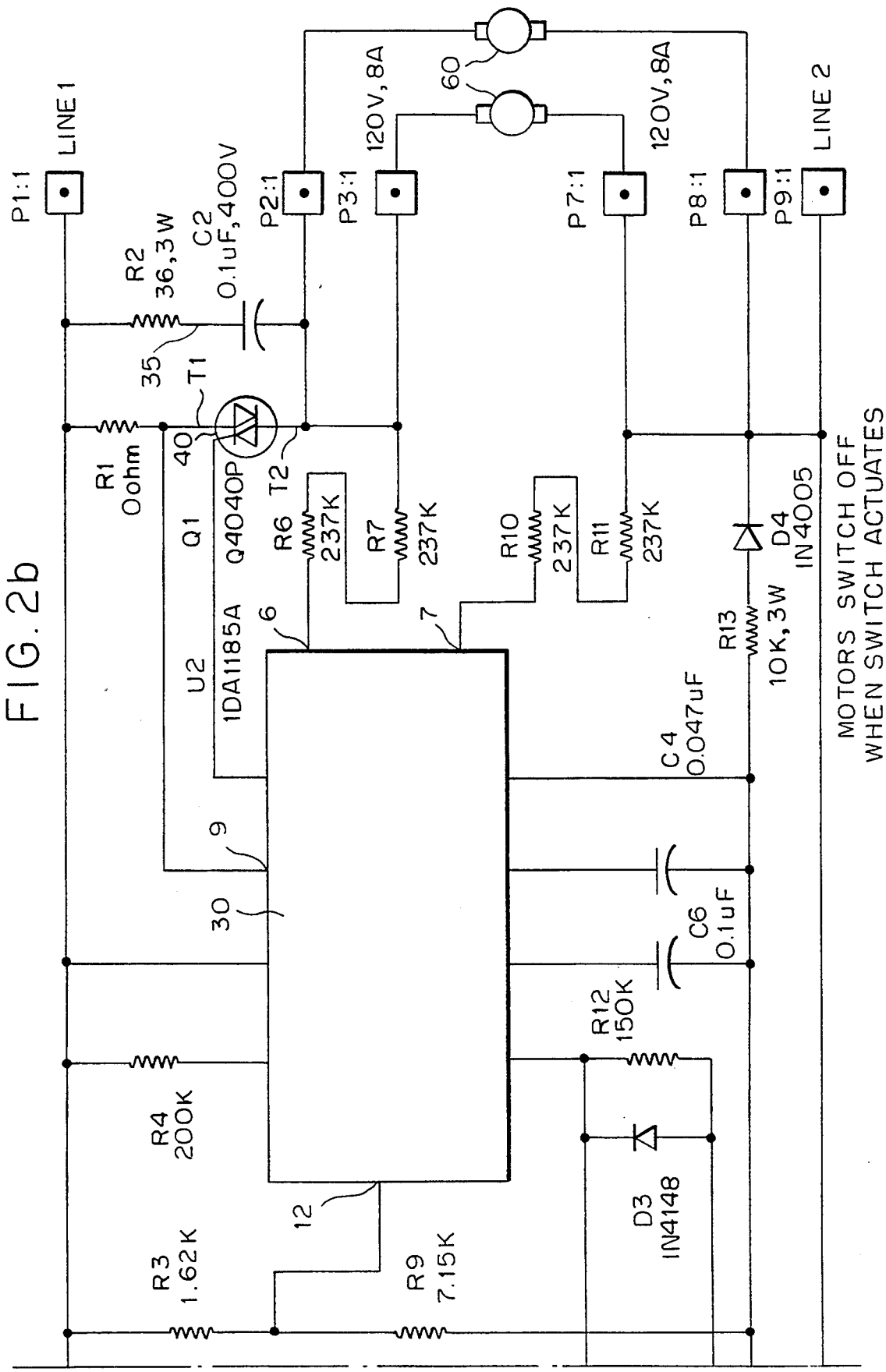

Trigger circuit 30 shown in FIGS. 1 and 2 includes a full-wave trigger pulse generator. Trigger circuit 30 should generate a controlled triac triggering pulse, and be capable of (a) repetitive pulses when triac current is interrupted by motor brush interruptions of the circuit, (b) triac current sensing to allow inductive loads, (c) soft starts, and (d) power failure detection and general circuit reset. Trigger circuit 30 preferably comprises a triac angle firing control circuit, such as Motorola's TDA1185A chip.

Resistors R3 and R9 form a voltage divider circuit connecting the power source output to pin 12, the control input of trigger circuit 30.

Connected between the motors and the trigger circuit are two sets of resisters in series. Resisters R6 and R7 connect to the node at the side T2 of triac Q1 to pin 6 for current sensing. Resisters R10 and R11 connect to the node at diode D4 to pin 7 for voltage sensing. Both pins 6 and 7 are connected to the full-wave trigger pulse generator. A positive feedback connection is made between pin 9 and the node at the side T1 of triac Q1.

Preferably, there is also a snubber circuit 35 connected in parallel with power switch 40 (triac Q1) to help limit dv/dt (the rate of rise in voltage) and control the voltage rise during triac shut off. The Snubber circuit 35 is a series RC network consisting of resistor R2 and capacitor C2. Capacitor C2 limits dv/dt across triac Q1. Resister R2 limits the surge current from the capacitor C2 when the triac Q1 begins conducting.

Once the recovery tank is emptied, the reed switch 5 of float switch 10 goes back to its normal state. Toggling the external switch 45 resets the flip-flop gates, and transistor Q1 of float 10 is turned off again by the flip-flop circuit. This breaks the circuit float switch 10 formed with optoisolator 20. The triggering circuit 30 is now in condition to restart the motor the next time the power line switch is actuated.

The present invention has been described in detail above for purposes of illustration only, and is not intended to be limited by this description or otherwise to exclude any variation or equivalent that would be apparent from, or reasonably suggested by, the foregoing disclosure to one skilled in the art. Other embodiments of the invention will be apparent to one skilled in the art from consideration of the description and practice of the invention disclosed herein.

We claim:

1. A motor control device for limiting in-rush current to a motor, comprising:
   a float switch means,
   a triggering circuit means, and power switching means;
   wherein said float switch means actuates when the water level in a liquid recovery tank rises to a predetermined height;
   wherein said float switch means sends a signal to said triggering circuit means;
   whereby said triggering circuit means triggers said power switching means to switch off the motor;
   wherein a restart signal is sent to said power switching means after the water has been emptied from the recovery tank;
   wherein upon restart, the triggering circuit means initiates a soft start of the motor through said power switching means,
   wherein said power switching means is a triac,
   wherein a snubber circuit is connected to said triac.

2. A device according to claim 1, wherein a series RC network is connected in parallel with said triac.

3. A device according to claim 1, wherein an optoisolator means is connected between the float switch means and the triggering circuit means.

4. A device according to claim 1, wherein said triggering circuit means comprises a full-wave trigger pulse generator.

5. A device according to claim 1, wherein said triggering circuit means receives positive feedback from the power switching means.

* * * * *